(12) United States Patent
Mallary (10) Patent No.: US 6,359,744 B1
(45) Date of Patent: Mar. 19, 2002

(54) REDUCING THERMAL DECAY OF DATA SIGNALS RECORDED ON MAGNETIC MEDIA

(75) Inventor: Michael Mallary, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/394,665

(22) Filed: Sep. 13, 1999

(51) Int. Cl.⁷ .................................................. G11B 5/09
(52) U.S. Cl. .............................. 360/40; 360/55; 360/41; 360/44; 360/65; 360/53
(58) Field of Search .............................. 341/58; 360/55, 360/39, 40, 41, 44, 45, 46, 65, 53

(56) References Cited

U.S. PATENT DOCUMENTS 4,027,335 A * 5/1977 Miller ........................ 360/40
4,656,546 A * 4/1987 Mallary ...................... 360/110
6,163,421 A * 12/2000 Shinpuku et al. ............. 360/46
6,175,319 B1 * 1/2001 Schneider et al. ............ 360/65

* cited by examiner

Primary Examiner—Alan T. Faber
(74) Attorney, Agent, or Firm—David M. Sigmond (57) ABSTRACT

A data storage device 15 comprises a recording head 35 and a recording media comprising a layer of magnetic material having an anisotropy that is substantially perpendicular to a plane of the layer. The device encoder 80 is adapted to provide an encoded data signal for recording data in encoded bit cells on the magnetic media 30, the encoded data signal comprising a sequence of signal transitions comprising added equalization signal transitions, the equalization signal transitions being added so that a plurality of the encoded bit cells comprises an average magnetization field strength that is substantially null.

65 Claims, 3 Drawing Sheets

REDUCING THERMAL DECAY OF DATA SIGNALS RECORDED ON MAGNETIC MEDIA

BACKGROUND

The present invention relates to an apparatus and method for improving retention and reducing decay of data recorded on perpendicular magnetic media.

Data storage devices, such as hard disks, are used to store data, instruction sets and computer programs. A typical disk drive comprises a number of disks each having a magnetic media surface coupled with a recording head. The magnetic media surface comprises magnetic material which typically stores data as one of two distinct magnetization states—corresponding to 0 and 1 of the data signal. The recording head recognizes recorded bits of information by detecting pulse peaks within certain timing windows. However, systems inadvertently shift pulse patterns, in time, with respect to the timing of the windows and this results in errors. It follows that when linear density is increased, the time windows in which the pulse peak must be detected are narrower and the systems become more sensitive to noise and there are resulting errors.

Data recording systems become even more prone to error when the data storage capacity of the magnetic media is increased. The data storage capacity is increased by increasing the areal density of data which is a function of the number of tracks that can be packed onto the magnetic media surface and the number of bits of data that can be stored per linear inch. Higher areal densities can be facilitated by reducing the size or volume of the grains (individual crystals) on the magnetic media surface. However, as the volume of a grain becomes smaller, the grain becomes more susceptible to spontaneous switching of its state of magnetization at room temperature or with the application of even a small amount of external energy, such as a rise in temperature or the presence of demagnetizing fields. In general, the energy barrier to spontaneous switching of a magnetized grain is equal to the product of its magnetic anisotropy (K) and the volume (V) of the grain. Random thermal energy causes the magnetization direction to become random at a rate, $R=w \exp(-E_{magnet}/kT)$, where w is the "attempt frequency" (about $10^9$/sec), k is Boltzmann's constant, and T is the absolute temperature. In newly developed magnetic media, the volume of each individual grain is reaching a sufficiently small size that the state of magnetization of the grain can spontaneously switch due to thermoagitation at the operating temperature of the storage device. Such spontaneous switching of magnetization states is undesirable because it gives rise to a decay of the quality of the data over time and the ultimate loss of recorded data.

The spontaneous switching of magnetization states is reduced by recording on perpendicularly oriented data storage media which has perpendicular uniaxial anisotropy which means that the grains are oriented in a substantially perpendicular direction to the plane of the media. In perpendicular recording, write heads record data by having the perpendicularly oriented media pass between a write pole and its mirror image in a magnetically soft underlayer. The perpendicularly oriented grains are taller and have a larger grain volume for a given diameter and consequently are more resistant to spontaneous switching of domains. In addition, the writeable coercitivity of perpendicular media with a soft underlayer can be 2 to 3 times that of longitudinal media. Thus, the volume of a thermally stable grain can be reduced, thereby reducing the area of a bit to achieve higher density. Thus perpendicular recording methods provide a significantly higher areal density than conventional longitudinal recording methods because they provide a gain in thermally stable data density which is two to four times that provided by conventional longitudinal recording methods. Perpendicular recording media utilizing, for example, cobalt-chrome alloys can replace conventional CoCTa longitudinal media (presently used) and achieve densities greater than 30 MB/cm$^2$. In these alloys, the crystal structure is hexagonal. They have an excellent ability to produce small, independent magnets, which have a moderately high anisotropy energy K of about $1 \times 10^6$ ergs/cm$^3$.

However, in perpendicular recording media, it is believed that a large demagnetization field (Hd) occurs in the long run length regions of the data signal recorded on the media. By "long run lengths" it is meant a region of the recorded data signal that has a constant value of magnetization field strength, such as a region having predominantly, or substantially only, bits corresponding to the "0" state. In these regions, the state of magnetization of each grain within the region, experiences a self-demagnetization force because the grain is magnetized perpendicular to the plane of the media and has an inherent demagnetization field that is trying to switch back its magnetization state, the strength of the demagnetization field being equal to the magnetization strength of the grain. Thus, for example, a portion of the media magnetized with 5000 Gauss has a demagnetization field trying to switch it back which is also 5000 Oer. The demagnetization field tends to reverse or switch back the magnetization state of the grain and consequently the presence of the field reduces the energy barrier required for demagnetization of the grain. Thus, the long run length regions are particularly sensitive to any increase in thermal energy which would further lower the energy barrier required to promote demagnetization of the grain, and consequently cause thermal decays in the data signal.

Accordingly, it is desirable to have an apparatus and method of storing data on data storage media that maximizes its data storage capacity. It is further desirable to reduce decay of the data signals stored on the data storage media, especially in the long run length regions of the data. Therefore, it is desirable to reduce the demagnetizing fields in these regions, especially on perpendicular media. In particular, it is desirable to have a disk drive with increased capacity, reduced error rates, and high level of retention of signals.

SUMMARY

An apparatus and method according to the principles of the present invention maximizes the data storage capacity of magnetic media while reducing decay of the data signals stored on the media, especially in the long run length regions of the data. In one aspect, the present invention comprises a data storage device comprising a recording head and a recording media comprising a layer of magnetic material having an anisotropy that is substantially perpendicular to a plane of the layer. The device further comprises an encoder adapted to provide an encoded data signal for recording data in encoded bit cells on the magnetic media, the encoded data signal comprising a sequence of signal transitions comprising added equalization signal transitions, the equalization signal transitions being added so that a plurality of the encoded bit cells comprises an average demagnetization field strength that is substantially null.

In another version, the data storage device comprises a recording head; a recording media comprising a layer of magnetic material having an anisotropy that is substantially perpendicular to a plane of the layer; and an encoder adapted to provide a data signal to the recording head for recording data on the magnetic media, the data signal comprising 0s represented by a first set of signal transitions and 1s represented by a second set of signal transitions, the first set being different from the second set.

In yet another version, the data storage device comprises a recording head; a recording media comprising a layer of magnetic material having an anisotropy that is substantially perpendicular to a plane of the layer; and an encoder adapted to provide an encoded data signal for recording data in encoded bit cells on the magnetic media, the encoded data signal comprising a sequence of signal transitions comprising added equalization signal transitions, the equalization signal transitions being added so that the demagnetization field strength in Oersted is less than about 75% of the saturation magnetization in Gauss.

In another aspect, the present invention comprises a method of recording data on magnetic media, the method comprising the step of selecting a magnetic media comprising a layer of magnetic material having an anisotropy that is substantially perpendicular to a plane of the layer and providing an encoded data signal for recording data in encoded bit cells on the magnetic media, the encoded data signal comprising a sequence of signal transitions comprising added equalization signal transitions, the equalization signal transitions being added so that a plurality of the encoded bit cells comprise an average magnetization field strength that is substantially null.

In another version, the method comprises the steps of selecting magnetic media comprising a layer of magnetic material having an anisotropy that is substantially perpendicular to a plane of the layer; and providing a data signal for recording data on the magnetic media, the data signal comprising 0s represented by a first set of signal transitions and 1s represented by a second set of signal transitions, the first set being different from the second set. Preferably, at least one of the first and second sets of signal transitions comprise alternating signal transitions.

DRAWINGS

These and other features, aspects, and advantages of the present invention will be better understood from the following drawings, description, and appended claims, all of which provide illustrative examples of the invention, where:

DESCRIPTION

Figures 1, 2:
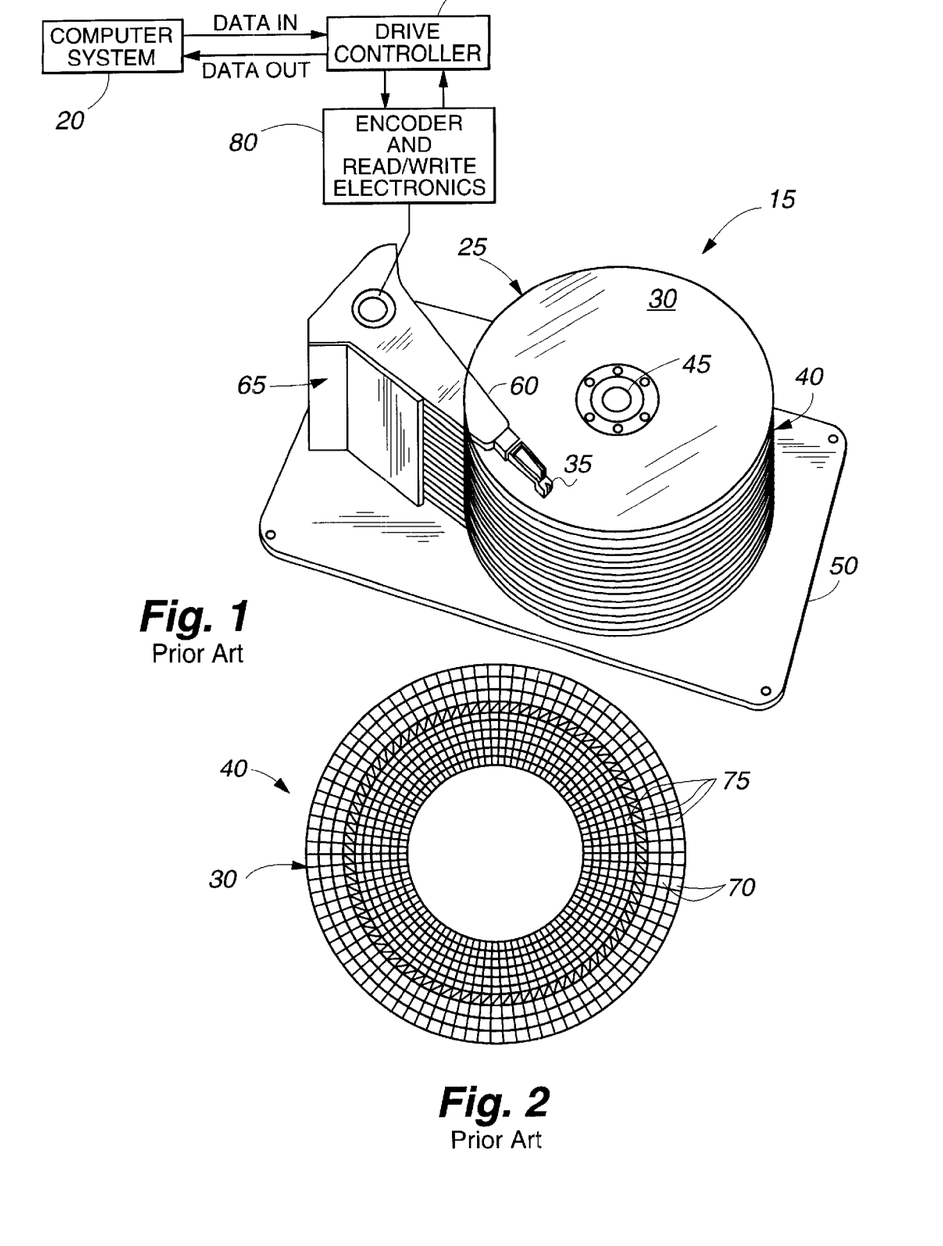
FIG. 1 (prior art) is a schematic perspective view of a hard disk drive having one or more disk surfaces comprising magnetic data storage media for storing data signals according to the present invention.
FIG. 2 (prior art) is a plan view of a magnetic media surface showing concentric data tracks and data portions.

FIG. 1 illustrates an exemplary apparatus 10 embodying the principles of the present invention. The apparatus 10 comprises a data storage device 15 and an interface to a host computer 20. The computer 20 typically comprises a central processor unit (CPU), such as for example a Pentium™ processor commercially available from Intel Corporation, Santa Clara, Calif., that is coupled to a random access memory (RAM) and other peripheral computer components, such as a floppy disk and drive, a compact disc reader, miscellaneous card racks, a data output device such as a monitor or display, and data input devices, such as a keyboard and mouse (not shown). The data storage device 15 comprises for example, a hard disk drive 25 comprising magnetic media 30 and recording heads 35 for reading and writing data onto the magnetic media 30. The magnetic media 30 comprises a plurality of disks 40, each disk comprising a platter having layers of magnetic materials capable of recording data signals. The disks 40 are mounted on a spindle 45 that is rotatably attached to a baseplate 50. A drive motor (not shown) turns the spindle 45 to move the disks 40 past a magnetic recording head 35 which is suspended by a positioner arm 60 over each surface of the magnetic media 30. Generally, the magnetic recording head 35 is attached to the positioner arm 60 by a head gimbal assembly (not shown) that enables the magnetic recording head 35 to swivel to conform to the magnetic media 30 on the disks 40. An actuator motor 65 positions the magnetic recording head 35 over an area of the magnetic media 30 to read or write data thereon. Generally, the disks 40 rotate at high speeds and the recording head 35 rides over the magnetic media 30 on an air cushion. While these examples are provided to illustrate the principles of the invention, the present invention should not be limited to the examples provided herein, and includes all applications that would be apparent to one of ordinary skill in the art.

Referring to FIG. 2, typically each magnetic media 30 is divided into a plurality of concentric circular tracks 70 that each have individually addressable portions 75, such as sectors, in which data is stored in bit cells. A drive controller 82 controls operation of the recording head 35 and movement of the magnetic media 30 to read and write data onto the magnetic media 30. The controller 82 comprises a micro computer and application specific integrated circuit chips in an electronic circuit, and also has embedded therein or uses system software comprising program code that monitors and operates the encoder 80. During a read or data retrieval operation, the computer 20 determines each "address" where the data is located on the disk drive 25, i.e., the recording head number, the track 70, and the relevant portion(s) 75 of the track 70 on the magnetic media 30. This data is transferred to the encoder 80 which maps the address to the physical location in the drive 25, and operates the actuator motor 65 and suspension arm 60 to position the recording head 35 over the corresponding track 70. As the magnetic media 30 rotates, the recording head 35 reads the address of each addressable portion 75 in the track 70. When the identified addressable portion 75 appears under the recording head 35, the entire contents of the addressable portion 75 containing the desired data are read. In reading data from the magnetic media 30, a read element senses a variation in an electrical current flowing through a magnetoresistive sensor of the read element when it passes over an area of flux reversal on the surface of the magnetic media 30. The recovered data is read into a cache memory chip in the disk drive 25 from where it is transferred to the computer system 20. Writing or storing data on the magnetic media 30 is the reverse of the process for reading data. During a write operation, the host computer system 20 remembers the addresses for each file on the magnetic media 30 and which portions 75 are available for new data. The encoder 80 operates the actuator motor 65 to position a recording head 35 over a particular track 70, settles the head 35 into position, and waits for the appropriate portions 75 to rotate under the head 35 to perform the actual writing of data. To write data to the magnetic media 30, an electrical current is passed through a write coil in the write element (not shown) of the recording head 35 to create a magnetic field across a gap 105 (FIG. 3) in a pair of write poles that magnetizes the magnetic material on the magnetic media 30 proximate to the recording head 35. When the track 70 is full, the encoder 80 moves the recording head 35 to the next available track 70 providing a sufficient contiguous space for writing data. If still more track capacity is required, another recording head 35 is used to write data to another portion 75 of another track 70.

Figure 3:
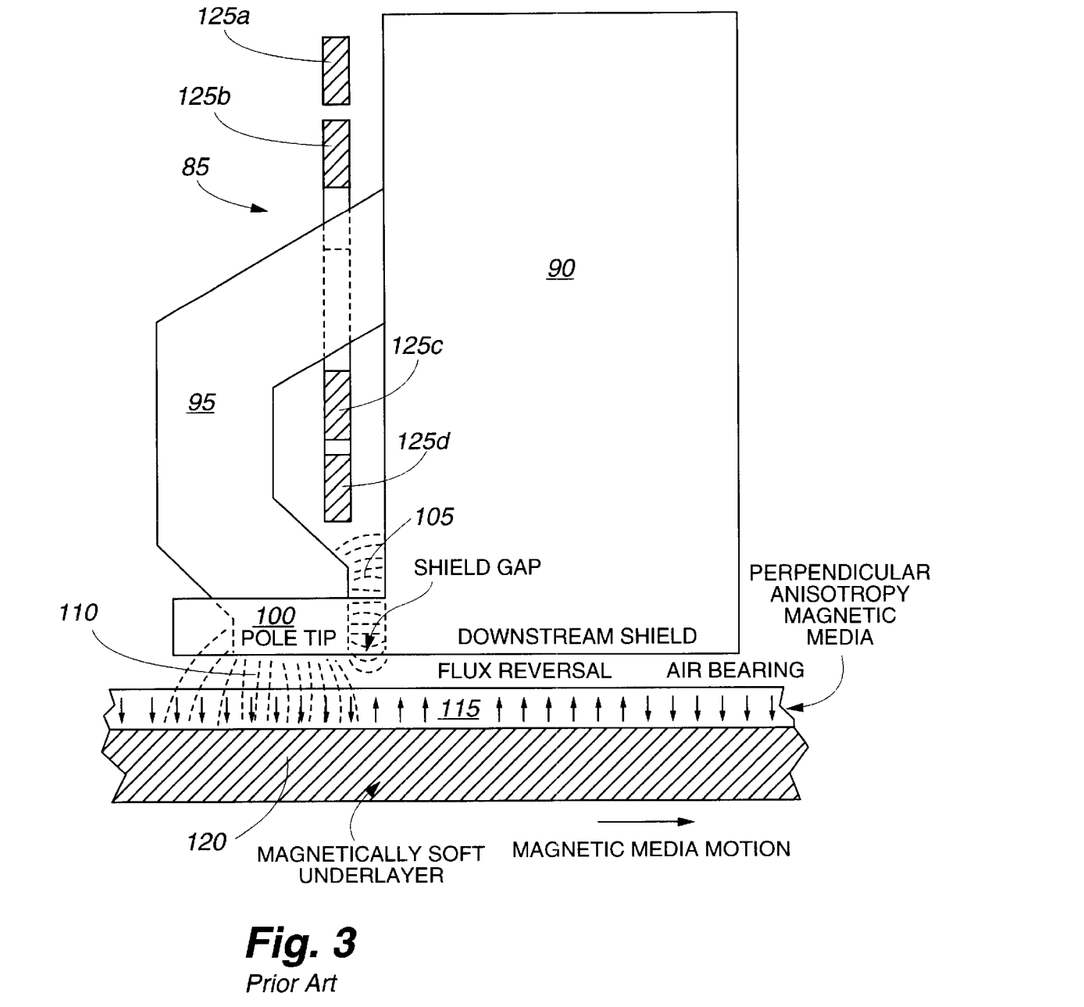
FIG. 3 is a side view of a write head showing the write pole section formed in a partial loop and with its coils shown in a sectional view.

Referring to FIG. 3, preferably the recording head 35 comprises a shielded pole write head 85, as for example described in detail in U.S. Pat. No. 4,656,546, which is incorporated herein by reference. The recording head 35 comprises a downstream magnetic shield 90 which is integrally formed with a write pole section 95 having a tip 100. A magnetic flux 110 is generated between the write pole tip 100 and the soft underlayer 120 by passing a high frequency current through the coils 125a–d. The shield 90 and the write pole tip 100 are located with a small gap 105 therebetween, so that magnetic flux 110 which fringes from the write pole tip 100 is intercepted by the shield 90. Accordingly such fringing flux 110 does not pass through the magnetic media 30, and hence if a data bit has been written into the magnetic media its dipole identity will not be weakened by the fringing flux 110 of a subsequent data bit being written into the magnetic media. In addition, the perpendicular magnetic media 30 is made up of a first layer 115 of material having perpendicular uniaxial anisotropy in which the magnetic anisotropy is substantially perpendicular to a plane of the layer 115, such as for example, cobalt chromium; and an underlying second layer 120 made of a material which has a low magnetic flux reluctance characteristic, such as for example, nickel iron. Accordingly, the magnetic flux 110 passes vertically through the first layer 115, along the second layer 120 and finally passes vertically from the second layer 120 through the first layer 115 into the shield 90. The face of the shield 90 is designed to be many times as large as the face of the write pole section 95 so that the density of the flux 110 from the tip 100 is sufficient to effect a vertical recording while the density of the flux 110 passing into the downstream magnetic shield 90 is low and hence a previously recorded pattern is not reversed.

Figure 4:
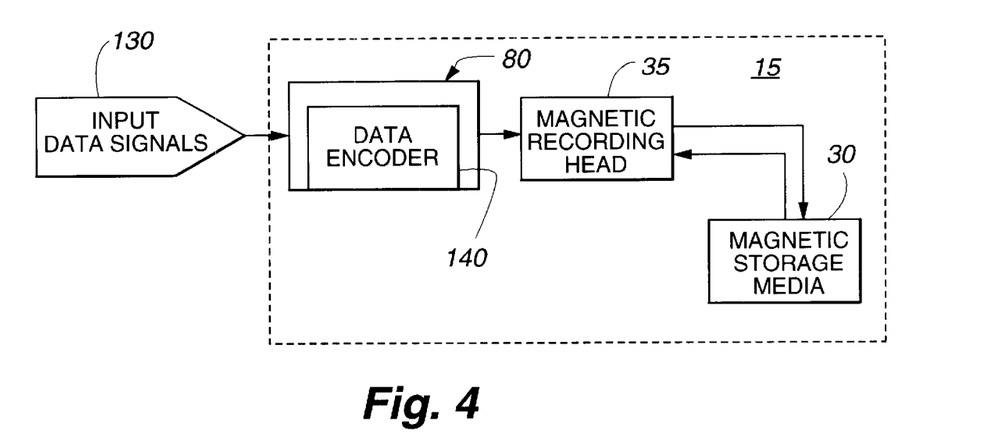
FIG. 4 is a flow chart illustrating steps of an embodiment of the present method for reducing the average magnetization field strength of long run lengths of data.
Figure 5:
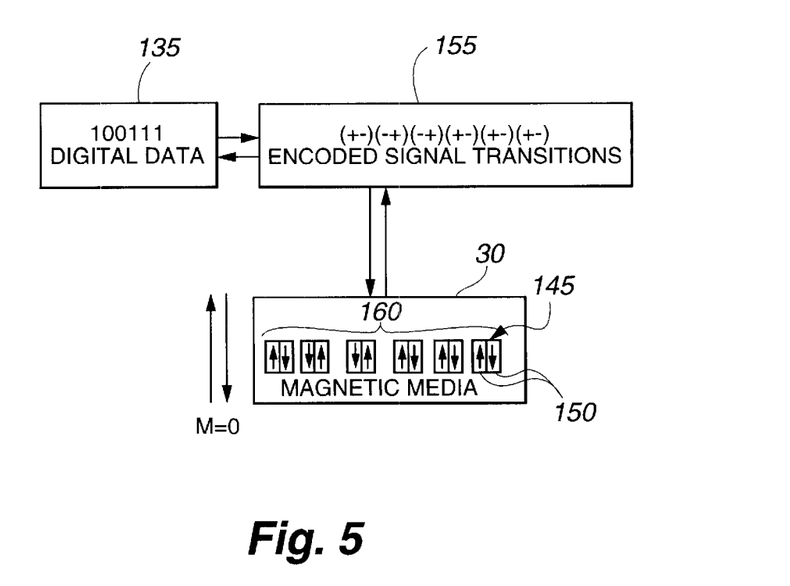
FIG. 5 is a schematic showing encoding of a data signal with extra equalization signal transitions, and recording of the data signal as magnetization states of the grains on perpendicular media.

In the present invention, the encoder 80 comprises a data encoder 140 and is adapted to provide an encoded data signal to the recording head 35 for recording or reading data on the perpendicular anisotropy magnetic media 30, as illustrated in FIGS. 4 and 5. Generally, the input data signal bits 130 comprises digital data 135 comprising a sequence of bits of 0s and 1s, and the encoder 80 provides a fluctuating electrical current comprising current pulses that represent bits to the recording head 35 which causes the signal to be recorded in distinct magnetization states in cells of the magnetic media 30. In conventional recording methods, each bit is written in a bit cell of magnetic media 30 by a single signal transition, with each data bit being either a 0 or a 1, and being recorded sequentially using a write current transition for a 1 and no current transition for a 0. A data sequence of 0s and 1s is recorded conventionally on the magnetic media 30 by alternating between the two magnetization states. A 1 is recorded as a change in a magnetization state of the medium—a magnetic transition—and a 0 as an absence of a magnetic transition. The data is recorded by applying to the recording head 35 an electrical current that alternates polarity (has a transition) for a 1 and remains constant for a 0.

However, in the present encoding system, the input data signal bits 130 are encoded by a data encoder 140 that is integral with the encoder 80, and recorded on the magnetic media 30 so that each encoded bit cell 145 comprises a ½, ⅓, ¼ or other fractionated subcell 150. For example, if a conventional bit cell is recorded over a length of 4 microinches of magnetic media 30, possible subcells 150 are fractions of that, e.g., 2 microinches corresponding to a ½ fraction, 1.33 microinches corresponding to a ⅓ fraction, 1 microinch corresponding to a ¼ fraction, 0.8 microinches corresponding to a ⅕ fraction, and so on. Each encoded bit cell 145 comprises a plurality of subcells 150 that each contain a magnetization state representing single encoded signal transition 155. The input data signal bits 130 are coded to a plurality of up/down or down/up signal transitions 155, and each signal transition is recorded in a single subcell 150 so that the average magnetization field strength value of the encoded bit cell 145 is substantially null or zero. Breaking the bit cell 145 into fractionated subcells 150 allows the addition of extra signal transitions 155 to the input data signal bits 130 to reduce or neutralize the magnetization field strength across a long run length of data bits 160. If the user data does not contain transitions, i.e., changes from 0 to 1 for a certain number of cells, then the data encoder 140 puts in the transitions for those cells. Thus, the data encoder 140 adds extra equalization signal transitions to regions of the magnetization pattern recorded on the media 30 that would otherwise be transitionless. The resultant sequence of encoded data signal transitions 155 comprise equalization signal transitions that are added so that a string 160 comprising a plurality of encoded bit cells 145 comprise an average magnetization field strength that is substantially null.

In a preferred configuration, each encoded bit cell 145 comprises a pair of subcells 150 which is a ½ fractionated conventional bit cell. The larger ½ fractionated cell simplifies the writing code and allows the data bits to be spaced sufficiently far apart to write accurate signal transitions on perpendicular magnetic media 30 using conventional recording heads 35. Every encoded bit cell 145 comprises an average or net magnetization field strength of zero because of the presence of additional opposing equalization signal transitions, such as magnetically up and down signal transitions within the subcells 150 that make up an encoded bit cell 145. Preferably, the equalization signal transitions are added so that a string comprising a plurality of encoded bit cells 145 comprise adjacent signal transitions having opposing polarity, and more preferably added so that the average saturation magnetization field strength of three or less encoded bit cells 145 and more preferably each encoded bit cell 145 is substantially null. Preferably, the plurality of encoded bit cells 145 comprises a string 160 of at least two encoded bit cells 145, more preferably at least three encoded bit cells, and most preferably at least four encoded bit cells 145. This prevents long data strings 160 that contain repeating data bits from having a strong demagnetization field.

In one version, the encoder 80 receives input data signal bits 130 and encodes the signal or each data bit such that a 0 is represented by a first set of signal transitions and a 1 is represented by a second set of signal transitions. Each set of signal transitions is different to distinguish one from the other, and preferably comprises alternating signal transitions, and more preferably at least one pair of alternating signal transitions, to reduce the demagnetization field resulting from a string 160 of data bits recorded on the magnetic media 30. Because each encoded data bit cell 145 comprises at least two signal transitions, each data bit occupies two magnetic domains or subcells 150, with one domain having a first polarity and the other domain having the reverse polarity. The first and second sets of signal transitions each comprise a plurality of signal transitions so that a string of encoded bit cells 145 comprises an average magnetization field strength that is substantially null. Preferably, the alternating signal transitions are selected so that a plurality of signal transitions adjacent to one another result in a substantially null magnetization field in a long run length region of the recorded data signal. By "null magnetization field strength" it is meant that the average demagnetization field that occurs from a plurality of signal transitions that are in close proximity or adjacent to one another, is substantially zero. The net demagnetization field results because there are as many positive poles as negative poles within the run length regions that the demagnetization field produced by poles having the opposite polarity are proximate to one another and thus cancel each other out.

In one embodiment, the first set of signal transitions comprises a pair of signal transitions and the second set of signal transitions comprises another pair of signal transitions that is distinguishable from the first pair. In this encoding method, there are twice as many subcells 150 as encoded bit cells 145, as illustrated in FIG. 5. The data signal is encoded so that each "0" has the write current and magnetization state corresponding to (−) in the first half of the encoded bit cell 145 and (+) in the second half of the encoded bit cell, to provide the state (−+). Conversely, each encoded bit "1" has a configuration of (+−). With this arrangement of data bits, a long string or run length of data, such as for example, 0001000, would be recorded as the data bits −+−+−++−−+−+−+, as shown in Table 1. In conventional recording media, the long run length of three "0" data bits next to one another—all of which are recorded as the (−) magnetization state—have a summed effect that provides a net demagnetization field strength that tends to promote thermal decay of the recorded data. However, in the encoded and recorded data signal, the alternate (+) and (−) magnetic poles which are positioned adjacent to one another tend to cancel out the net magnetization field strength effect, thereby providing a demagnetization field that is substantially null. In essence, the encoded data code forces reversal of a magnetization field in order to prevent large regions of uniform magnetization which have a high demagnetization field. By appropriately placing extraneous signal transitions in the magnetic media 30, the demagnetization fields are significantly reduced while retaining the ability to retrieve the recorded data signal. Preferably, the encoder is adapted to add equalization signal transitions so that the demagnetization field strength in Oersted is less than about 75% of the saturation magnetization in Gauss.

The coded magnetization patterns of data signals suitable for recorded different user data code patterns are shown in Table 1. Also listed are worst case normalized demagnetization field strengths that would enhance thermal decay of the magnetization pattern. The associated demagnetization field, Hd, is normalized by Ms (normalized Hd in Oersted/Gauss) and is for a media thickness that is 1.5 times the smallest bit cell space. In addition, the code program that was used to calculate the coded magnetization pattern for the user data, flanked the data patterns with all ones starting +/−10 cells away.

TABLE I

| USER DATA PATTERN | WRITE CURRENT | Hd/Ms (Worst Case) |
|---|---|---|
| 0001000 | −+−+−++−−+−+−+ | .083 |
| 0001100 | −+−+−++−+−−+−+ | .117 |
| 1111111 | +−+−+−+−+−+−+− | .008 |
| 0000000 | −+−+−+−+−+−+−+ | .008 |
| 010101010 | −++−−++−−++−−+ | .046 |
| 001001001 | −+−++−−+−++−−+ | .091 |
| 000100010001 | −+−+−++−−+−+−++− | .134 |
| | Worst of 10,000 random strings of 20 bits = | .138 |

In contrast, for long run length data patterns that are used with the encoding recording scheme, the worst case of Hd/Ms is 1.0. This compares with the worst case of Hd/Ms <0.138 for the two phase code described above for a sample of 10,000 randomly generated 20 bit strings, which is a bigger improvement. For Ms/Hd =0.333 this would raise the energy barrier by 71%. If Ms is optimized to 70 percent of Hc, the net increase in the energy barrier is 103%. Also, this value of Ms/Hc is much closer to that of the perpendicular magnetic media 30 that is presently being produced so it is relatively practical and can be used without too much difficulty.

Doubling the energy barrier in this method would provide a 60% increase in the area density of a scaled-down system (the potential density being proportional to Eb**(⅔)).

However, there are some limitations to this encoding scheme. The demagnetization field is essentially what the recording head 35 detects and the sequential 1(s) and the sequential 0(s) are nearly the same at low Hd. They differ by only a half cell phase shift on a very weak signal. This ambiguity can be resolved provided that the data prior to the start of a long run length data string (0000 or 11111) is correctly detected which is not always an easy task. It should also be regarded that a long run length of the data string 010101 in general has a low Hd.

This ambiguity makes it desirable to have a code scheme that not only reduces the worst case of demagnetization field strength but also has one bit pattern with a very low field. This can be achieved by a recording scheme in which a user data bit "0" switches the write current twice in each encoded bit cell 145 and a user data bit "1" switches it only once. For instance, a user data bit "0" is encoded as bits "11" and a user data bit "1" is encoded as bits "10". An encoded pi; "1" changes the write current but an encoded "0" does not. Thus, for example, a user data bit string 0001000 provided the coded bits 11111110111111 and the write current comprising a sequential alternating (+) and (−). Application of this recording method to different user bit patterns and the resultant coded magnetization or write current patterns are shown in Table II. In this case, the worst value of Hd is the same for this scheme (0.138) on the sample of 10,000 20 bit long strings.

This ambiguity makes it desirable to have a code scheme that not only reduces the worst case of demagnetization field strength that also has one bit pattern with a very low field. This can be achieved by a recording scheme in which a user data bit "0" switches the write current twice in each encoded bit cell 145 and an user data bit "1" switches it only once. Thus, for example, a user data bit string 0001000 provided the coded bits 11111110111111 and the write current comprising a sequential alternating (+) and (−). Application of this recording method to different user bit patterns and the resultant coded magnetization or write current patterns are shown in Table 11. In this case, the worst value of Hd is the same for this scheme (0.138) on the sample of 10,000 20 bit long strings.

TABLE II

| USER DATA BITS | ENCODED DATA BITS | WRITE CURRENT | Hd/Ms |
|---|---|---|---|
| 0001000 | 11111110111111 | +–+–+–+––+–+–+– | .138 |
| 0001100 | 11111110101111 | +–+–+–+––++–+–+ | .08 |
| 1111111 | 10101010101010 | ++––++––++––++– | .08 |
| 0000000 | 11111111111111 | +–+–+–+–+–+–+–+ | .008 |
| 01010101 | 11101110111011 | +–+–––+–++–+–––+– | .116 |
| 001001001 | 11111011111011 | +–+–+–––+–+–++–+ | .124 |
| Worst of 10,000 | | Random Strings of 20 bits = | .138 |

In yet another embodiment, the recording scheme can utilize a partial response that is constructed around an even number fractionalization of the bit cell. For a ¼ fractionated encoded bit cell 145 this translates to recorded magnetization states according to:

"1"→"++++";

"0"→"–+–+" after "+" and "+–+–" after "–"; and

"–1"→"– – – –". A "1" cannot follow a "1" and a "–1" cannot follow a "–1". The Hd/Ms however is higher.

Other encoding systems are also possible. One less efficient encoding system which would not reduce demagnetization fields as much as when each subcell contains an up or down signal transition is one in which each up or down signal transition is allowed to be followed by at most two down cells or two up cells before the next opposing signal transition.

When the present encoding scheme is applied to record data on perpendicular recording media herein, a very high ratio of Ms/Hc of about 1 Gauss/Oersted is obtained while preserving thermal stability. In conventional recording methods, a low Ms/Hc ratio of about ⅓ is optimum for thermal stability because of the large demagnetization fields, Hd, in the long run length regions of constant magnetization of the data signal recorded on the media. In these regions, Hd is equal to Ms so a high Ms results in a high Hd and a lowering of the energy barrier that prevents thermally induced switching of the grains. Another consideration is that the write field must exceed Hc+Ms. Balancing all of these considerations results in optimal areal density at the ratio of Ms/Hd of ⅓. However, the present coding scheme at least partially removes or reduces the demagnetization field effects in the long run length regions of the data, to provide an optimum Ms/Hc ratio of almost 1 and the energy barrier per grain volume is increased by a factor of 2.3. This allows a 73% increase in the areal density of a system that is limited by super-paramagnetic decay of data. Thus, the encoded recording methods described herein on perpendicular magnetic media 30 increases the energy barrier per unit volume which inhibits thermal decay. This allows for the use of smaller magnetic grains which can support up to a 60% higher areal density and correspondingly higher magnetic media densities.

Another advantage is that the present encoding system provides DC free codes that can be transmitted over a data line through a capacitor or a transformer without a DC reference code. This is because the encoded data achieves a null magnetization state or DC free condition over a much smaller number of encoded bit cells 145 than conventional recording schemes.

The present invention has been described in considerable detail with reference to preferred versions that are provided only to illustrate the invention and should not be used to limit the scope of the invention. For example, other coding schemes that provide equivalent null type magnetization states in long run lengths of the data can be generated by one of ordinary skill based upon the principles of the present invention. Thus, the scope of the present invention should not be limited to the appended claims which are directed to embodiments according to the principles of the present invention.

What is claimed is:

1. A data storage device comprising:
  (a) a recording head;
  (b) a magnetic media comprising a layer of magnetic material having an anisotropy that is substantially perpendicular to a plane of the layer; and
  (c) an encoder adapted to convert a data signal into an encoded data signal for recording data in encoded bit cells on the magnetic media, the encoded data signal comprising a sequence of signal transitions comprising added equalization signal transitions, the equalization signal transitions being added for at least each 0 or 1 in the data signal, the equalization signal transitions being added so that a plurality of the encoded bit cells comprises an average magnetization field strength that is substantially null.

2. A data storage device according to claim 1 wherein the encoder is adapted to provide an encoded data signal comprising equalization signal transitions that are added so that the plurality of encoded bit cells comprise signal transitions having opposing polarity.

3. A data storage device according to claim 1 wherein the encoder is adapted to provide an encoded data signal comprising equalization signal transitions that are added so that the plurality of encoded bit cells comprises a string of at least two encoded bit cells.

4. A data storage device according to claim 1 wherein the encoder is adapted to provide an encoded data signal comprising equalization signal transitions that are added so that the plurality of encoded bit cells comprises a string of at least three encoded bit cells.

5. A data storage device according to claim 3 wherein the encoder is adapted to provide an encoded data signal comprising equalization signal transitions that are added so that the plurality of encoded bit cells comprises a string of at least four encoded bit cells.

6. A data storage device according to claim 1 wherein the encoder is adapted to provide an encoded data signal comprising equalization signal transitions that are added so that the average magnetization field strength of each encoded bit cell is substantially null.

7. A data storage device according to claim 1 wherein the encoder is adapted to provide an encoded data signal comprising equalization signal transitions that are added so that each encoded bit cell comprises signal transitions having opposing polarity.

8. A data storage device comprising:
  (a) a recording head;
  (b) a magnetic media comprising a layer of magnetic material having an anisotropy that is substantially perpendicular to a plane of the layer; and
  (c) a encoder adapted to provide a data signal to the recording head for recording data on the magnetic media, the data signal comprising 0s represented by a first set of signal transitions and 1s represented by a second set of signal transitions, the first set being different from the second set so that the average magnetization is substantially zero over 3 or less bit cells.

9. A data storage device according to claim 8 wherein at least one of the first and second sets of signals transitions comprises alternating signal transitions.

10. A data storage device according to claim 8 wherein both the first and second set of signal transitions comprise alternating signal transitions.

11. A data storage device according to claim 8 wherein a plurality of sets of signal transitions comprises an average magnetization field strength that is substantially null.

12. A method of recording data on magnetic media, the method comprising the steps of:
  (a) selecting a magnetic media comprising a layer of magnetic material having an anisotropy that is substantially perpendicular to a plane of the layer; and
  (b) converting a data signal into an encoded data signal for recording data in encoded bit cells on the magnetic media, the encoded data signal comprising a sequence of signal transitions comprising added equalization signal transitions, the equalization signal transitions being added for at least each 0 or 1 in the data signal, the equalization signal transitions being added so that a plurality of the encoded bit cells comprises an average magnetization field strength that is substantially null.

13. A method according to claim 12 wherein the equalization signal transitions are added so that the plurality of encoded bit cells comprise adjacent signal transitions having opposing polarity.

14. A method according to claim 12 wherein the plurality of encoded bit cells comprises a string of at least two encoded bit cells.

15. A method according to claim 12 wherein the plurality of encoded bit cells comprises a string of at least three encoded bit cells.

16. A method according to claim 12 wherein the plurality of encoded bit cells comprises a string of at least four encoded bit cells.

17. A method according to claim 12 wherein the equalization signal transitions are added so that the average magnetization field strength of each encoded bit cell is substantially null.

18. A method according to claim 12 wherein the equalization signal transitions are added so that each encoded bit cell comprises signal transitions having opposing polarity.

19. A method of recording data on magnetic media, the method comprising the steps of:
  (a) selecting magnetic media comprising a layer of magnetic material having an anisotropy that is substantially perpendicular to a plane of the layer; and
  (b) providing a data signal for recording data on the magnetic media, the data signal comprising 0s represented by a first set of signal transitions and 1s represented by a second set of signal transitions, the first set being different from the second set.

20. A method according to claim 19 wherein at least one of the first and second sets of signals transitions comprise alternating signal transitions.

21. A method according to claim 19 wherein both the first and second sets of signals transitions comprise alternating signal transitions.

22. A method according to claim 19 wherein the first and second sets of signal transitions each comprise at least one pair of alternating signal transitions.

23. A method according to claim 19 wherein a plurality of the first and second sets of signal transitions comprise an average magnetization field strength that is substantially null.

24. A data storage device comprising:
  (a) a recording head;
  (b) a magnetic media comprising a layer of magnetic material having an anisotropy that is substantially perpendicular to a plane of the layer; and
  (c) an encoder adapted to provide an encoded data signal for recording data in encoded bit cells on the magnetic media, the encoded data signal comprising a sequence of signal transitions comprising added equalization signal transitions, the equalization signal transitions being added so that the demagnetization field strength in Oersted is less than about 75% of the saturation magnetization in Gauss.

25. A method of recording data on magnetic media, the method comprising the steps of:
  (a) selecting magnetic media comprising a layer of magnetic material having an anisotropy that is substantially perpendicular to a plane of the layer; and
  (b) providing an encoded data signal for recording data on the magnetic media, the encoded data signal comprising a sequence of signal transitions comprising added equalization signal transitions, the equalization signal transitions being added so that the demagnetization field strength in Oersted is less than about 75% of the saturation magnetization in Gauss.

26. A disk drive, comprising:
  a recording head;
  a magnetic media comprising a layer of magnetic material having an anisotropy that is substantially perpendicular to a plane of the layer; and
  an encoder that converts a data signal from an external device into an encoded data signal for recording data in encoded bit cells on the magnetic media, wherein the encoded data signal provides multiple signal transitions between opposite voltage polarities for at least the 0s or 1s in the data signal.

27. A disk drive according to claim 26 wherein the encoded data signal provides multiple signal transitions between opposite voltage polarities for one of the 0s and the 1s in the data signal but not the other of the 0s and the 1s in the data signal.

28. A disk drive according to claim 26 wherein the encoded data signal provides multiple signal transitions between opposite voltage polarities for the 0s and the 1s in the data signal.

29. A disk drive according to claim 26 wherein the encoded data signal provides multiple signal transitions between opposite voltage polarities for one of the 0s and the 1s in the data signal and a single signal transition between opposite voltage polarities for the other of the 0s and the 1s in the data signal.

30. A disk drive according to claim 26 wherein the encoded data signal provides two signal transitions between opposite voltage polarities for one of the 0s and the 1s in the data signal and one signal transition between opposite voltage polarities for the other of the 0s and the 1s in the data signal.

31. A disk drive according to claim 26 wherein each of the encoded bit cells has an average magnetic field strength that is substantially null.

32. A disk drive according to claim 26 wherein each of the encoded bit cells is in a string of at most three of the encoded bit cells that has an average magnetic field strength that is substantially null.

33. A disk drive according to claim 26 wherein each of the encoded bit cells has a demagnetization field strength in Oersted that is less than 75% of its saturation magnetization in Gauss.

34. A disk drive according to claim 26 wherein each of the encoded bit cells is in a string of at most three of the encoded bit cells that has a demagnetization field strength in Oersted that is less than 75% of its saturation magnetization in Gauss.

35. A disk drive according to claim 26 wherein the multiple signal transitions include equalization signal transitions that substantially reduce thermal decay in the magnetic media.

36. A disk drive, comprising:
a recording head;
a magnetic media comprising a layer of magnetic material having an anisotropy that is substantially perpendicular to a plane of the layer; and
an encoder that converts a data signal from an external device into an encoded data signal for recording data in encoded bit cells on the magnetic media, wherein each of the encoded bit cells corresponds to a single bit in the data signal, and the encoded bit cells corresponding to at least the 0s or 1s in the data signal include multiple magnetization states that are opposite one another.

37. A disk drive according to claim 36 wherein the encoded bit cells include multiple magnetization states that are opposite one another for one of the 0s and the 1s in the data signal but not the other of the 0s and the 1s in the data signal.

38. A disk drive according to claim 36 wherein the encoded bit cells include multiple magnetization states that are opposite one another for the 0s and the 1s in the data signal.

39. A disk drive according to claim 36 wherein the encoded bit cells include multiple magnetization states that are opposite one another for one of the 0s and the 1s in the data signal and a single magnetization state for the other of the 0s and the 1s in the data signal.

40. A disk drive according to claim 36 wherein the encoded data signal provides two magnetization states that are opposite one another for one of the 0s and the 1s in the data signal and one magnetization state for the other of the 0s and the 1s in the data signal.

41. A disk drive according to claim 36 wherein each of the encoded bit cells has an average magnetic field strength that is substantially null.

42. A disk drive according to claim 36 wherein each of the encoded bit cells is in a string of at most three of the encoded bit cells that has an average magnetic field strength that is substantially null.

43. A disk drive according to claim 36 wherein each of the encoded bit cells has a demagnetization field strength in Oersted that is less than 75% of its saturation magnetization in Gauss.

44. A disk drive according to claim 36 wherein each of the encoded bit cells is in a string of at most three of the encoded bit cells that has a demagnetization field strength in Oersted that is less than 75% of its saturation magnetization in Gauss.

45. A disk drive according to claim 36 wherein the multiple magnetization states include equalization magnetization states that substantially reduce thermal decay in the magnetic media.

46. A disk drive, comprising:
a recording head;
a magnetic media comprising a layer of magnetic material having an anisotropy that is substantially perpendicular to a plane of the layer; and
an encoder that converts a data signal from an external device into an encoded data signal for recording data in encoded bit cells on the magnetic media, wherein the encoded data signal includes equalization signal transitions, each of the encoded bit cells corresponds to a single bit in the data signal, each of the encoded bit cells is in a string of N of the encoded bit cell(s), where $1 \leq N \leq 3$, and each of the strings has an average magnetic field strength that is substantially null.

47. A disk drive according to claim 46 wherein the encoded data signal provides the equalization signal transitions between opposite voltage polarities for one of the 0s and the 1s in the data signal but not the other of the 0s and the 1s in the data signal.

48. A disk drive according to claim 46 wherein the encoded data signal provides the equalization signal transitions between opposite voltage polarities for the 0s and the 1s in the data signal.

49. A disk drive according to claim 46 wherein the encoded data signal provides the equalization signal transitions for each of the strings.

50. A disk drive according to claim 46 wherein N is equal to one.

51. A disk drive according to claim 46 wherein N is equal to two.

52. A disk drive according to claim 46 wherein N is equal to three.

53. A disk drive according to claim 46 wherein each of the encoded bit cells has a demagnetization field strength in Oersted that is less than 75% of its saturation magnetization in Gauss.

54. A disk drive according to claim 46 wherein each of the strings has a demagnetization field strength in Oersted that is less than 75% of its saturation magnetization in Gauss.

55. A disk drive according to claim 46 wherein the equalization signal transitions substantially reduce thermal decay in the magnetic media.

56. A disk drive, comprising:
a recording head;
a magnetic media comprising a layer of magnetic material having an anisotropy that is substantially perpendicular to a plane of the layer; and
an encoder that converts a data signal from an external device into an encoded data signal for recording data in encoded bit cells on the magnetic media, wherein each of the encoded bit cells corresponds to a single bit in the data signal, each of the encoded bit cells is in a string of N of the encoded bit cell(s), where $1 \leq N \leq 3$, and each of the strings has a demagnetization field strength in Oersted that is less than 75% of its saturation magnetization in Gauss.

57. A disk drive according to claim 56 wherein the encoded bit cells include multiple magnetization states that are opposite one another for one of the 0s and the 1s in the data signal but not the other of the 0s and the 1s in the data signal.

58. A disk drive according to claim 56 wherein the encoded bit cells include multiple magnetization states that are opposite one another for the 0s and the 1s in the data signal.

59. A disk drive according to claim 56 wherein the encoded bit cells include multiple magnetization states that are opposite one another for one of the 0s and the 1s in the data signal and a single magnetization state for the other of the 0s and the 1s in the data signal.

60. A disk drive according to claim 56 wherein N is equal to one.

61. A disk drive according to claim 56 wherein N is equal to two.

62. A disk drive according to claim 56 wherein N is equal to three.

63. A disk drive according to claim 56 wherein each of the encoded bit cells has an average magnetization field strength that is substantially null.

64. A disk drive according to claim 56 wherein each of the strings has an average magnetization field strength that is substantially null.

65. A disk drive according to claim 56 wherein each of the strings include equalization magnetization states that substantially reduce thermal decay in the magnetic media.

* * * * *